(12) United States Patent
Hayakawa et al.

(10) Patent No.: US 7,954,848 B2
(45) Date of Patent: Jun. 7, 2011

(54) INFLATOR

(75) Inventors: Shinichi Hayakawa, Aichi-ken (JP); Toru Ozaki, Aichi-ken (JP); Yasushi Masuda, Aichi-ken (JP); Hiroyuki Ochi, Himeji (JP); Shinya Hasegawa, Himeji (JP); Hirotaka Mukunoki, Himeji (JP)

(73) Assignees: Toyoda Gosei Co., Ltd., Aichi-pref. (JP); NipponKayaku KabushikiKaisha, Tokyo (JP)

( * ) Notice: Subject to any disclaimer, the term of this patent is extended or adjusted under 35 U.S.C. 154(b) by 0 days.

(21) Appl. No.: 12/659,851

(22) Filed: Mar. 23, 2010

(65) Prior Publication Data

US 2010/0253053 A1   Oct. 7, 2010

(30) Foreign Application Priority Data

Mar. 24, 2009 (JP) .................. 2009-072196
Feb. 2, 2010 (JP) .................. 2010-021448

(51) Int. Cl.
*B60R 21/26* (2006.01)
(52) U.S. Cl. ...................................... 280/736
(58) Field of Classification Search .................. 280/736, 280/740, 741
See application file for complete search history.

(56) References Cited

U.S. PATENT DOCUMENTS

| 5,628,528 | A | 5/1997 | DeSautelle et al. |
| 6,364,354 | B1 | 4/2002 | Nakashima et al. |
| 6,412,815 | B1 | 7/2002 | Nakashima et al. |
| 6,460,883 | B1 | 10/2002 | Nakashima et al. |
| 6,460,884 | B1 | 10/2002 | Nakashima et al. |
| 6,491,320 | B1 | 12/2002 | Nakashima et al. |
| 6,557,888 | B1 | 5/2003 | Nakashima et al. |
| 2002/0063420 | A1 | 5/2002 | Nakashima et al. |
| 2006/0151977 | A1 | 7/2006 | Yamazaki et al. |

FOREIGN PATENT DOCUMENTS

| JP | U-3033792 | 11/1996 |
| JP | A-11-91495 | 4/1999 |
| JP | A-11-157412 | 6/1999 |
| JP | A-11-509154 | 8/1999 |
| JP | A-2000-313304 | 11/2000 |
| JP | A-2002-283942 | 10/2002 |
| JP | A-2006-168670 | 6/2006 |

*Primary Examiner* — Faye M. Fleming
(74) *Attorney, Agent, or Firm* — Posz Law Group, PLC (57) ABSTRACT

An inflator includes in a combustion chamber a first gas generating charge and a second gas generating charge to be ignited and burned to generate an inflation gas. The second gas generating charge is slower in speed of combustion than the first gas generating charge. The inflator further includes a partition wall that segregates the first and second gas generating charges. The partition wall is located away from an ignition area of an ignition device that ignites the first gas generating charge, with the first gas generating charge located between itself and the ignition area. The partition wall is burnable to destruction by the fire generated by combustion of the first gas generating charge so as to permit propagation of the fire to the second gas generating charge by its generally entire area.

2 Claims, 5 Drawing Sheets

Fig. 5

INFLATOR

The Present application claims priority from Japanese Patent Application No. 2009-072196 of Hayakawa et al., filed on Mar. 24, 2009 and Japanese Patent Application No. 2010-021448 of Hayakawa et al., filed on Feb. 2, 2010, the disclosures of which are hereby incorporated into the present application by reference.

BACKGROUND OF THE INVENTION

1. Field of the Invention

The present invention relates to an inflator that generates inflation gas for inflating an airbag, and more particularly, relates to a pyrotechnic inflator that stores two kinds of gas generating charges that have different combustion speeds.

2. Description of Related Art

An inflator provided with two gas generating charges of different speeds of combustion is known in JP2002-283942 (FIG. 4). The inflator includes two combustion chambers partitioned by a bulkhead, a first gas generating charge of fast combustion speed, a second gas generating charge of slower combustion speed relative to the first, the charges being stored respectively in the two combustion chambers, and an ignition device for igniting the first gas generating charge.

This inflator is provided at part of the bulkhead between the two combustion chambers a portal through which a flame generated due to combustion of the first charge propagates to the second charge. With this arrangement, only a part of the second generating charge burns firstly, and it takes a long time for an entire second charge to be ignited. This may result in failure to obtain a sufficient amount of inflation gas immediately after initiation of actuation of the inflator (i.e., in the initial stage of actuation of the ignition device).

The reference referred to above also discloses in FIG. 3 an inflator wherein first and second gas generating charges are stored in a combustion chamber in a mixed fashion.

With this inflator, the first and second gas generating charges initiate combustion at the same time when the ignition device is actuated. However, if the second charge surrounds the first charge due to oscillation of a vehicle and, the like, it is likely that combustion of the second charge hinders quick combustion of the first charge. This may make it difficult to obtain a sufficient amount of inflation gas by combustion of the first charge immediately after actuation of the inflator. Moreover, oscillation of a vehicle and the like makes it difficult to keep the first and second gas generating charges in a steady, desired mixed condition in the combustion chamber. Therefore, it is difficult to guarantee steady performance for every inflator.

SUMMARY OF THE INVENTION

An object of the present invention is to provide an inflator that has a steady performance and assures a sufficient discharge amount of inflation gas immediately after actuation and long-duration discharge of inflation gas.

The inflator of the invention includes:
a combustion chamber;
an ignition device located inside the combustion chamber;
a first gas generating charge filled in the combustion chamber for combustion, by ignition of the ignition device, to generate an inflation gas;
a second gas generating charge filled in the combustion chamber at a location away from an ignition area of the ignition device, with the first gas generating charge interposed between itself and the ignition area, the second gas gener-ating charge being slower in speed of combustion than the first gas generating charge and ignitable by a flame generated by combustion of the first gas generating charge; and
a partition wall that segregates the first gas generating charge and second gas generating charge inside the combustion chamber so as to prevent the first and second charges from mixing, the partition wall being burnable to destruction by a fire built by combustion of the first gas generating charge so as to allow the fire to propagate to the second gas generating charge over a generally entire area that the partition wall bounds the first and second gas generating charges.

In the inflator of the invention, the partition wall segregating the first gas generating charge and second gas generating charge is located away from the ignition area of the ignition device. Accordingly, when the ignition device is actuated, it ignites and burns the first gas generating charge filled in the area proximate the ignition device, but not the second gas generating charge. Then a flame generated due to combustion of the first charge propagates to the second charge, and fires and burns the second charge so an inflation gas is generated.

Since the first gas generating charge located proximate the ignition device has a faster speed of combustion, it burns instantly upon actuation of the ignition device. The partition wall segregating the first charge and second charge is ignited by a flame generated by combustion of the first charge and burns down. This allows the flame of the first charge to propagate to the second charge via a generally entire area of the boundary area between the first and second gas generating charges. That is, when the first gas generating charge burns, the flame instantly propagates to the second charge over an entire area of the partition wall, and the second charge initiates combustion over a generally entire area contacting the partition wall, not delaying considerably from the combustion of the first charge.

That is, the inflator of the invention firstly fires only the first gas generating charge which is of faster combustion speed at actuation of the ignition device, and then makes the fire generated by combustion of the first charge propagate to the second charge quickly and over a wide area. Consequently, a great amount of the second gas generating charge burns after, but not delaying considerably, the combustion of the first gas generating charge, so that a sufficient amount of inflation gas is discharged by combustion of the first and second gas generating charges immediately after the actuation of the ignition device. Moreover, because the second gas generating charge is slower in speed of combustion than the first charge, it keeps burning even after completion of combustion of the first charge, so that the discharge of inflation gas lasts for a long time.

In the inflator of the invention, moreover, the partition wall prevents the first and second gas generating charges from mixing up and keeps the charges segregated. This construction assures a steady combustion condition, i.e., the condition that the first gas generating charge is firstly ignited by the ignition device and then the second gas generating charge is burned by the fire generated by combustion of the first charge, and therefore, eliminates piece-to-piece variations in performance and assures steady performance for every inflator.

Furthermore, the partition wall is burnable. This construction will not cause cooling of the inflation gas generated by combustion of the first and second gas generating charges but instead help raise or keep the temperature of the gas, thereby preventing the decrease of pressure of inflation gas in comparison with an instance where the partition wall is made of a nonburnable plate metal or the like.

Therefore, the inflator of the invention has a steady performance, assures a sufficient discharge amount of inflation gas immediately after actuation, and keeps discharging inflation gas for an elongated time period.

The way the partition wall burns down when ignited by the fire generated by combustion of the first gas generating charge should not be limited to a completely burning-down condition all over the boundary area between the first and second gas generating charges. The partition wall may remain unburned partly or leave residuals on the boundary of the first and second charges as long as the flame generated by combustion of the first charge can propagate to and ignite the second charge quickly.

It will also be appreciated that the inflator includes at least one of the first and second gas generating charges in a wrapped fashion by a burnable covering material. In this case, the area of the covering material in the boundary between the first and second gas generating charges constitutes the partition wall. This configuration will enable the first and/or second gas generating charges in the form of tablets or the like to be handled as a block, respectively, and therefore will make it convenient to handle the charges and facilitate the manufacturing of the inflator.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims. By way of example, although the invention will be described as applied to a generally tablet-shaped inflator, the contour of the inflator of the invention should not be limited thereby. The invention may be applied to an inflator having a generally cylindrical outer contour.

Figure 1:
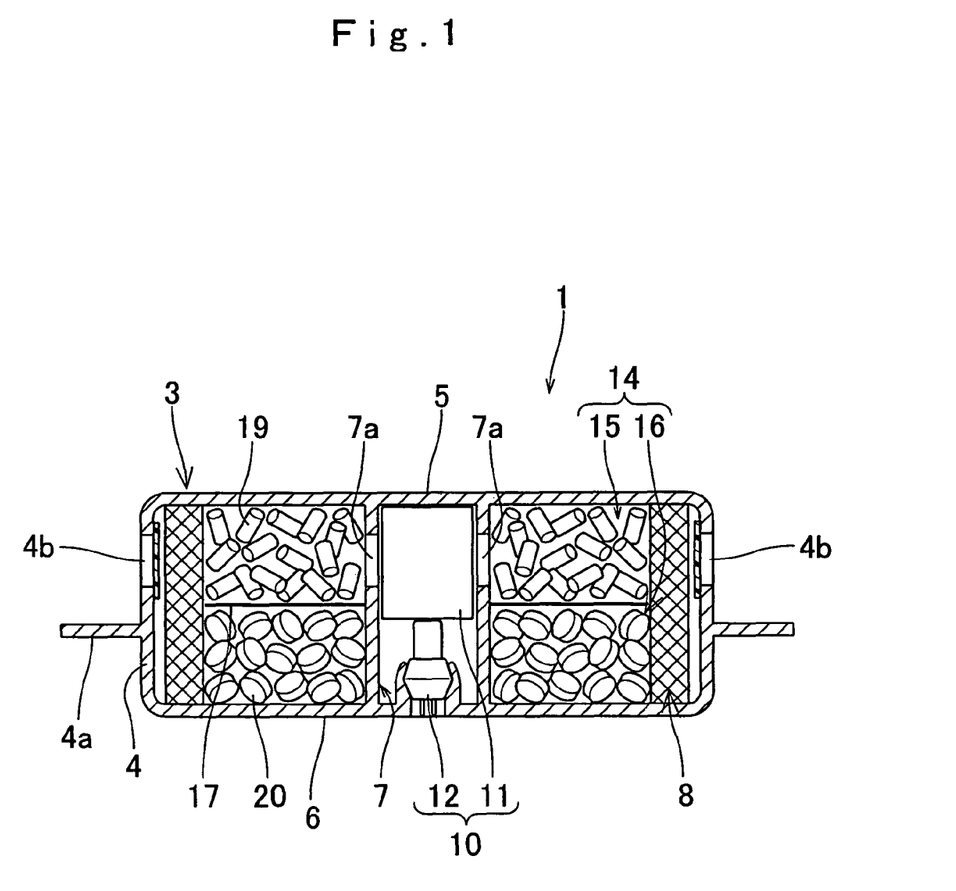
FIG. 1 is a schematic vertical section of an inflator embodying the present invention.

Referring to FIG. 1, the inflator 1 embodying the invention includes a main body 3 being generally columnar in shape, an ignition device 10 located inside the main body 3, a combustion chamber 14 comprised of a space defined by the main body 3 and ignition device 10, a first gas generating charge 19 and a second gas generating charge 20 stored inside the combustion chamber 14. In this embodiment, a "vertical direction" is intended to refer to the direction extending along an axial direction of the main body 3. That is, an upper side refers to the side where a later-described ceiling wall 5 is located in the main body 3 whereas a lower side refers to the side where the bottom wall 6 is located in the main body 3.

The main body 3 is made of steel plate of stainless or the like, and includes a circumferential wall 4 in the shape of a generally cylinder, a ceiling wall 5 and a bottom wall 6 each closing opposite ends in an axial direction of the circumferential wall 4. A generally annular flange 4a is formed on the circumference of the circumferential wall 4 in a projecting manner. Specifically, the flange 4a is located below the center in a vertical direction of the circumferential wall 4 (i.e., located to the bottom wall 6). The main body 3 further includes, proximate the ceiling wall 5 on the circumferential wall 4, and between the flange 4a and ceiling wall 5, numerous gas discharge ports 4b which are generally circular in shape and arranged over an entire area in a circumferential direction of the circumferential wall 4. These discharge ports 4b serve as outlets of an inflation gas generated by combustion of the first gas generating charge 19 and the second 20. Generally at the center of the main body 3 is a cover portion 7 that is generally cylindrical in shape and coaxial to the main body 3. The cover portion 7 connects the ceiling wall 5 with the bottom wall 6 inside the main body 3 and surrounds the ignition device 10 generally all over. The cover portion 7 is provided, on its region covering a later-described booster propellant 11 of the ignition device 10 and proximate the ceiling wall 5, with a plurality of communication ports 7a arranged along the circumferential direction, through which communication ports 7a a flame built by combustion of the booster propellant 11 propagates into the combustion chamber 14. Moreover, a generally cylindrical filter 8 made of a wire-mesh material or the like is arranged generally over an entire inner circumference of the circumferential wall 4. The filter 8 removes residuals contained in the inflation gas generated by combustion of the first and second gas generating charges 19 and 20 as well as cools the gas.

As shown in FIG. 1, the ignition device 10 is located inside the cover portion 7, along the center axis of the main body 3 at the center of the main body 3. The ignition device 10 includes booster propellant 11 located proximate the ceiling wall 5 inside the cover portion 7 and an initiator 12 supported at the bottom wall 6 for igniting the booster propellant 11. The booster propellant 11 is ignited and burned by the initiator 12 for building a fire, and the fire is propagated into a later-described upper compartment 15 of the combustion chamber 14 through the communication ports 7a formed on the cover portion 7, and thus the first gas generating charge 19 filled in the upper compartment 15 is ignited for combustion.

As shown in FIG. 1, the combustion chamber 14 is comprised of a space defined by the main body 3 and ignition device 10, more specifically a space defined by the ceiling wall 5 and bottom wall 6 of the main body 3, cover portion 7 and filter 8. The combustion chamber 14 of this specific embodiment is divided into two; an upper compartment 15 located on the side of the ceiling wall 5 and a lower compartment 16 located on the side of the bottom wall 6, by a generally donut-plate shaped (generally annular plate shaped) partition wall 17. The upper compartment 15 is in communication with the ignition device 10 by the communication ports 7a of the cover portion 7 and filled with the first gas generating charge 19. The lower compartment 16 is filled with the second gas generating charge 20. The speed of combustion of the first gas generating charge 19 is faster than that of the second gas generating charge 20. The partition wall 17 is located away from the ignition area of the ignition device 10 that ignites the first gas generating charge 19, and the first gas generating charge 19 is located between the ignition area and the partition wall 17. More specifically, the partition wall 17 is located away from the communication ports 7a of the cover portion 7 while having the first gas generating charge 19 interposed between itself and the communication ports 7a. Moreover, the partition wall 17 divides the combustion chamber 14 into the upper compartment 15 and lower compartment 16 in order to segregate the first gas generating charge 19 and the second 20. That is, the partition wall 17 prevents a flame generated by combustion of the booster propellant 11 from igniting the second gas generating charge 20 directly when the ignition device 10 operates. Further, the partition wall 17 is configured to propagate a flame generated by combustion of the first charge 19 to the second charge 20 by its generally entire area. Specifically, the partition wall 17 is comprised of a metal film that is flammable by a fire generated by combustion of the first gas generating charge 19. In this specific embodiment, the partition wall 17 is a separate entity from the main body 3 and is made of an aluminum film (aluminum foil) having a thickness of 50 μm.

The thickness of the aluminum film constituting the partition wall 17 is preferably 10 μm to 250 μm in the light of nonperishability and combustibility.

The upper compartment 15 can also be described as a "prior combustion compartment" since the first generating charge 19 that the upper compartment 15 stores burns prior to the second charge 20 stored in the lower compartment 16, whereas the lower compartment 16 can be named as a "subsequent combustion compartment".

In the inflator 1 of this embodiment, when the ignition device 10 is actuated, a flame built by combustion of the booster propellant 11 ignites and burns the first gas generating charge 19, and then a flame generated by combustion of the first gas generating charge 19 ignites and burns the second gas generating charge 20 as well as the partition wall 17.

The first gas generating charge 19 and the second gas generating charge 20 employed in the embodiment are respectively molded products of a mixture of predetermined fuels with binding agents and so on. Nonazide gas generant usually used as airbag propellant such as guanidine, aminotetrazole, triadine, hydrazine, triazole, azodicarbonamide, bitetrazole gas generant can be used as the gas generating charges of the embodiment.

The first gas generating charge 19 is fast in speed of combustion whereas the second gas generating charge 20 is slower in combustion speed relative to the first charge 19. Speed of combustions of the charges 19 and 20 can be differentiated by molding them from different compositions (i.e., molding the first gas generating charge 19 from a composition of faster speed of combustion than that for the second gas generating charge 20) or molding them into different outer contours, from the same composition, so their surface-area-to-volume ratios are different. The surface-area-to-volume ratio (which can be denoted sa/vol) is the amount of surface area per unit volume of each of the gas generating charges. The greater the sa/vol of a gas generating charge becomes, the faster the charge burns (burns out) due to increased exposure to oxygen. Therefore, the speed of combustion of the second gas generating charge 20 can be differentiated from the first charge 19 by molding the second charge 20 into such an outer contour that has a reduced surface-area-to-volume ratio relative to that of the first charge 19. Setting of the combustion speeds can be determined by either the change of composition or change of outer contour, or by combination of both. By way of example, if the second gas generating charge 20 is molded from a composition of slower speed of combustion than that for the first charge 19, into such an outer contour as has a reduced sa/vol than the first charge 19, the speed of combustion of the second charge 20 is made slower than the first charge 19.

In this specific embodiment, the first gas generating charge 19 is made from guanidine composition in the form of generally columns with 2.00 mm diameter, 6.5 mm length and around 2.31 $mm^2/mm^3$ sa/vol. The second gas generating charge 20 is made from aminotetrazole composition in the form of generally tablets with 10.00 mm diameter, 3.2 mm thickness, and around 1.03 $mm^2/mm^3$ sa/vol.

The speeds of combustion of gas generating charges referred to in this specification are based on those obtained by a tank combustion test. In the test, two inflators respectively filled with an equal weight of either gas generating charge are respectively secured in a metal talk having a predetermined volume, and actuated, when a tank pressure is measured. The speed of combustion is calculated from the peak value of tank pressure and the time taken to reach the peak value, which is obtained at completion of combustion of the gas generating charge. In this invention, it is defined that a gas generating charge has a faster speed of combustion if it exhibits an earlier time to reach the peak value.

In operation, when an actuating signal is fed to the inflator 1 mounted on a vehicle together with an airbag apparatus, the initiator 12 of the ignition device 10 is actuated to fire the booster propellant 11. The flame of the booster propellant 11 propagates into the combustion chamber 14 through the communication ports 7a of the cover portion 7, and the first gas generating charge 19 and second gas generating charge 20 filled in the combustion chamber 14 are burned in order. Then an inflation gas generated by combustion of the first and second gas generating charges 19 and 20 flows out of the inflator 1 via the gas discharge ports 4a and inflates an airbag of the airbag apparatus.

In the inflator 1, the partition wall 17 segregating the first charge 19 and second charge 20 is located away from the ignition area of the ignition device 10 (i.e., away from the communication ports 7a of the cover portion 7). Accordingly, when the ignition device 10 is actuated, it ignites and burns the first gas generating charge 19 filled in the area proximate the ignition device 10, but not the second gas generating charge 20. Then the flame built by combustion of the first charge 19 propagates to the second charge 20, and fires and burns the second charge 20 so an inflation gas is generated.

Since the first gas generating charge 19 located proximate the ignition device 10 has a faster speed of combustion, it burns instantly upon activation of the ignition device 10. The flame generated by combustion of the first charge 19 fires and burns down the partition wall 17 segregating the first charge 19 and second charge 20. Since the partition wall 17 is configured to propagate the flame to the second charge 20 by its generally entire area, the flame instantly propagates to the second charge 20 by the entire area of the partition wall 17, and the second charge 20 starts burning over the generally entire area contacting the partition wall 17, not delaying considerably from the initiation of combustion of the first charge 19. Specifically, since the partition wall 17 is comprised of an aluminum film burnable by a fire generated by combustion of the first gas generating charge 19, it burns down upon combustion of the first charge 19 and allows the first charge 19 to contact with the second charge 20. As a result, the fire generated by combustion of the first gas generating charge 19 propagates to the second charge 20 over the burned-down area of the partition wall 17.

As described above, the inflator 1 of the embodiment firstly fires only the first gas generating charge 19 which is of faster combustion speed at actuation of the ignition device 10, and then makes the fire generated by combustion of the first charge 19 propagate to the second charge 20 quickly and over a wide area. Consequently, with the inflator 1, a great amount of the second gas generating charge 20 burns after, but not delaying considerably, the initiation of combustion of the first gas generating charge 19, so that a sufficient amount of inflation gas is discharged by combustion of the first and second gas generating charges 19 and 20 immediately after the actuation of the ignition device 10. Moreover, because the second gas generating charge 20 is slower in speed of combustion than the first charge 19, it keeps burning even after completion of combustion of the first charge 19, so that the discharge of inflation gas lasts for a long time. Taking into consideration the balance of sufficient discharge amount of inflation gas immediately after the actuation of the ignition device 10 and duration of discharge of inflation gas, the ratio of the first charge 19 and second charge 20 filled in the inflator 1 is preferably in a range of 3:7 to 7:3.

In the inflator 1, the partition wall 17 prevents the first and second gas generating charges 19 and 20 from mixing up and keeps the charges 19 and 20 segregated. This construction assures a steady combustion condition, i.e., the condition that the first gas generating charge 19 is firstly ignited by the ignition device 10 and then the second gas generating charge 20 is ignited by the fire built by combustion of the first charge 19, and therefore, eliminates piece-to-piece variations in performance and assures steady performance for every inflator.

Moreover, the partition wall 17 is burnable. This construction will not cause cooling of the inflation gas generated by combustion of the first and second gas generating charges 19 and 20 but instead help raise or keep the temperature of the gas, thereby preventing the decrease of pressure of inflation gas in comparison with an instance where the partition wall is made of a nonburnable plate metal or the like. It is contemplable to construct the partition wall of a nonburnable material, together with such a communication aperture that permits fire propagation from the first charge to the second charge. However, such a partition wall will cause cooling of an inflation gas generated by combustion of the first and second charges 19 and 20 and consequently decrease the pressure of inflation gas and reduce output of the inflator, which is not preferable.

Therefore, the inflator 1 of the embodiment has a steady performance and assures a sufficient discharge amount of inflation gas immediately after actuation and long-duration discharge of inflation gas.

If the inflator 1 is used in an airbag apparatus, it will inflate an airbag quickly and keep the internal pressure of the airbag for an elongated time period.

Although the partition wall 17 employed in the inflator 1 is comprised of an aluminum film, the material of the partition wall to be burned at combustion of the first gas generating charge 19 should not be limited thereby. By way of example, the partition wall may be made of a film (foil) of other metal such as magnesium, thermoplastic resin, paper or the like, which are burnable as well.

The way the partition wall 17 burns down when ignited by the fire built by combustion of the first gas generating charge 19 should not be limited to a completely burning-down condition all over the boundary between the first and second gas generating charges 19 and 20. The partition wall may remain unburned partly or leave residuals on the boundary between the charges 19 and 20 as long as the flame generated by combustion of the first charge 19 can propagate to and ignite the second charge 20 quickly.

Figure 4:
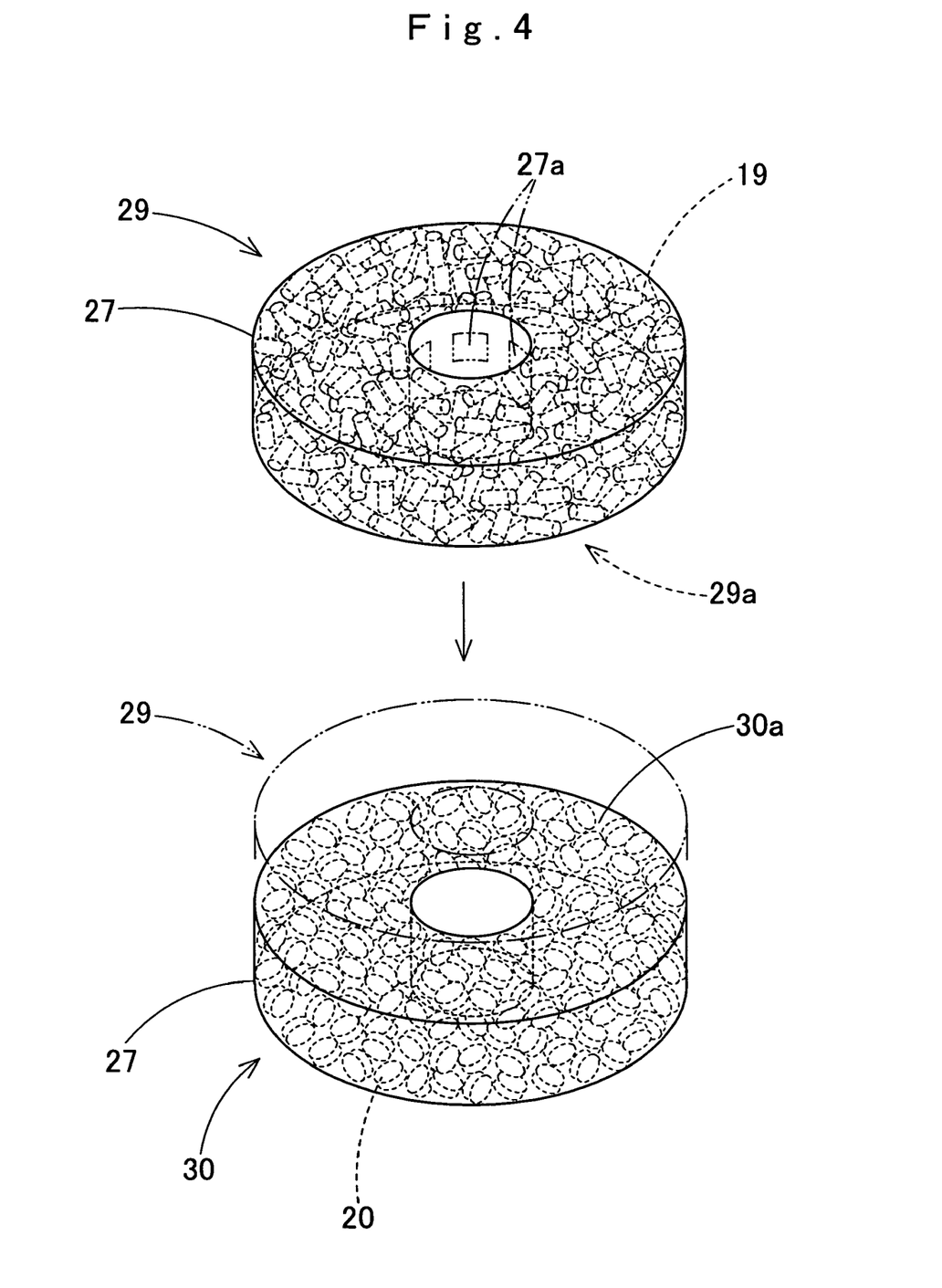
FIG. 4 illustrates by perspective view the first gas generating charge and second gas generating charge in an alternative embodiment, wherein each of the charges is wrapped by a covering material.
Figure 5:
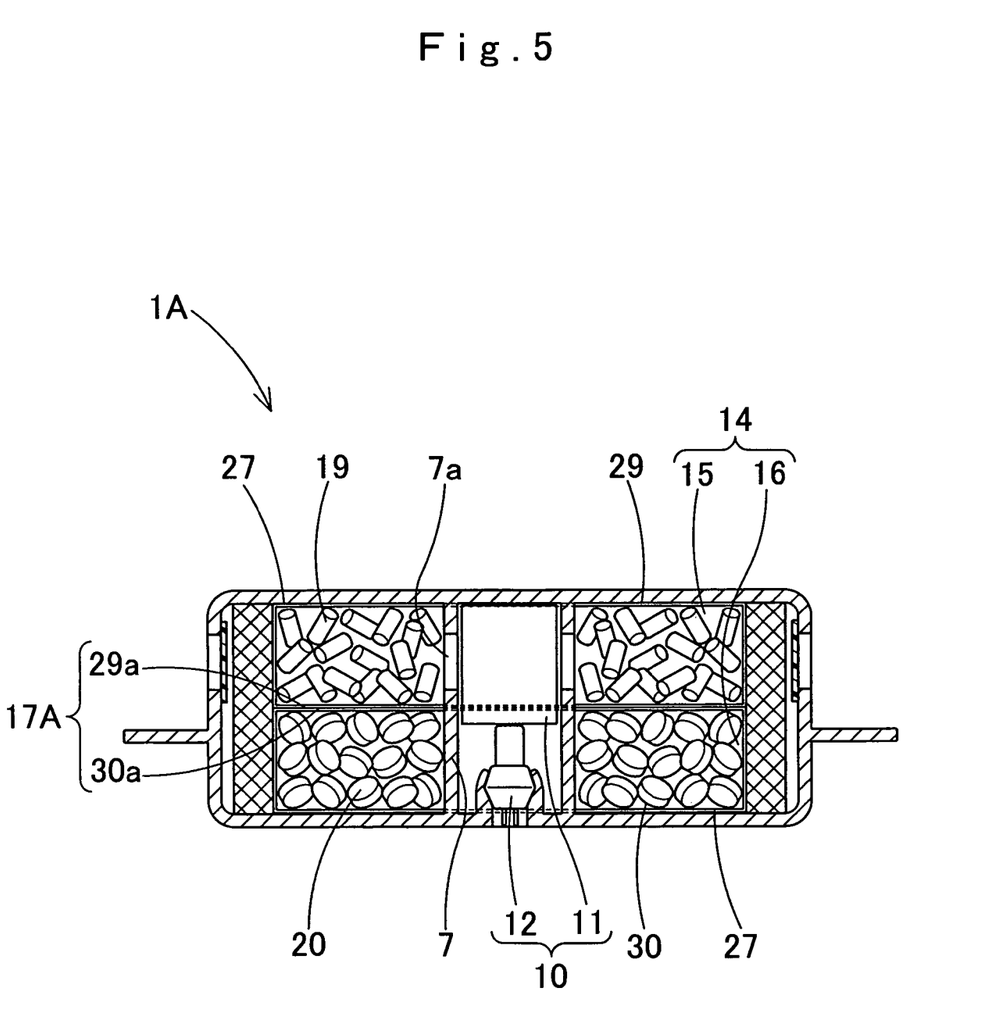
FIG. 5 is a schematic vertical section of an inflator filled with the first and second gas generating charges of FIG. 4.

In the foregoing embodiment, the combustion chamber 14 is divided into the upper compartment 15 housing the first gas generating charge 19 and the lower compartment 16 housing the second gas generating charge 20 by the partition wall 17 having a generally donut-plate shape. However, the contour of the partition wall that segregates the first and second gas generating charges 19 and 20 should not be limited thereby. The partition wall may be configured like a partition wall 17A described below in an alternative embodiment. FIGS. 4 and 5 illustrate an inflator 1A of the alternative embodiment, wherein the first gas generating charge 19 and the second gas generating charge 20 are respectively wrapped by a burnable covering material and formed into blocks 29 and 30. The charges 19 and 20 are located in the combustion chamber 14 in the form of blocks 29 and 30. The areas of the covering materials 27 that bound the first and second gas generating charges 19 and 20, i.e., the bottom wall 29a of the covering material 27 of the block 29 and the ceiling wall 30a of the covering material 27 of the block 30, overlap and form the partition wall 17A. This configuration will enable the first and second gas generating charges 19 and 20 in the form of tablets or the like to be handled as a block 29/30, respectively, and therefore will make it convenient to handle the charges 19 and 20 and facilitate the manufacturing of the inflator 1A.

The covering material 27 may be prepared in the form of a sheet, on which the first gas generating charge 19 or second gas generating charge 20 is placed and wrapped up by the covering material 27. The covering material 27 may also be prepared in the form of a container sized to be housed in the combustion chamber 14 and capable of housing the first and second gas generating charges 19 and 20. In either case, the gas generating charges 19 and 20 are set in the combustion chamber 14 in the form of the blocks 29 and 30 wrapped up by the covering materials 27.

Although both of the first and second gas generating charges 19 and 20 are wrapped up by the covering materials 27 in the illustrated embodiment, it will also be appreciated to wrap only one of the first and second gas generating charge 19 and 20 by the covering material 27.

In addition to the ignitability by the fire due to combustion of the first gas generating charge 19, the covering material 27 is required to be ignited and burn down also by the fire built by combustion of the booster propellant 11 of the ignition device 10 when the covering material 27 wraps the first gas generating charge 19 so as to be located between the first charge 19 and the ignition device 10. If the covering material 27 is hard to be ignited by the fire of the booster propellant 11, apertures 27a formed on the cover material 27, as indicated by double-dashed lines in FIG. 4, can be used to permit direct fire propagation from the booster propellant 11 to the first gas generating charge 19.

It will also be appreciated to form the partition wall into a generally box or bag shape capable of housing the second gas generating charge therein such that the partition wall filled with the second charge is located inside the combustion chamber which is preliminarily filled with the first gas generating charge. In this instance, the partition wall needs to be located away from the ignition are of the ignition device, i.e., away from the booster propellant or communication ports of the cover portion, with the first charge interposed between itself and the ignition area. On this condition, the location and/or contour of the partition wall can be determined arbitrarily.

Figure 2:
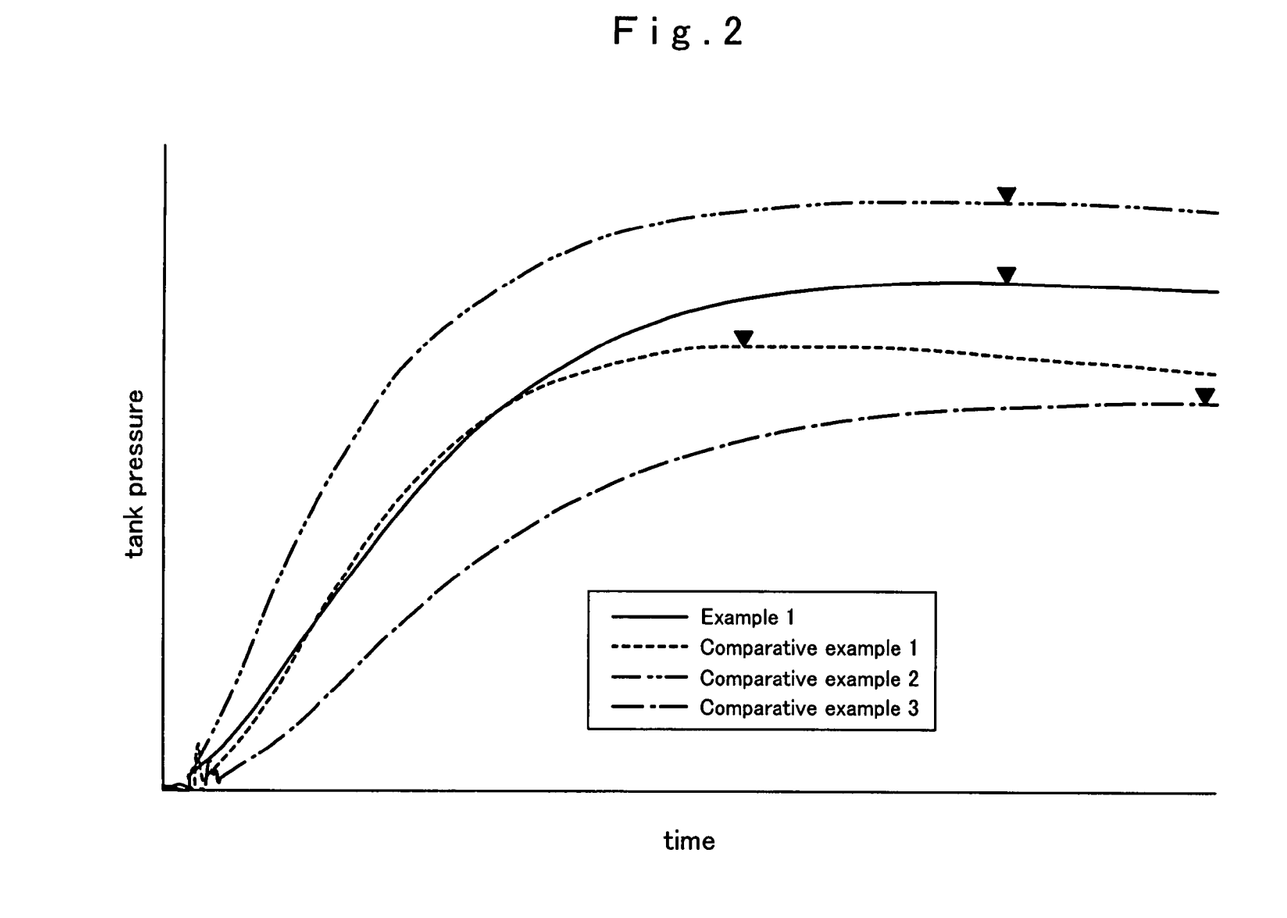
FIG. 2 is a graph showing the result of a tank pressure test of the inflator of FIG. 1 and those of comparative examples.

In FIG. 2, a graph is shown indicating measurements of outputs of Example 1 which uses the inflator 1 of the foregoing embodiment and Comparative examples 1 to 3 employing other inflators. The inflator of Example 1 is prepared as follows: The upper compartment 15 communicating with the ignition device 10 is filled with 22 grams of the first gas generating charge 19 comprised of guanidine composition and formed generally into columns with 2.0 mm diameter, 6.5 mm length and about 2.31 $mm^2/mm^3$ sa/vol (surface-area-tovolume ratio). The lower compartment 16 is filled with 26 grams of the second gas generating charge 20 comprised of aminotetrazole composition and formed generally into tablets with 10.0 mm diameter, 3.2 mm thickness and about 1.03 mm$^2$/mm$^3$ sa/vol. The ratio of the first charge 19 and second charge 20 used is 6:7 by weight. The inflator 1 of Example 1 employs the partition wall 17 comprised of an aluminum film with 50 μm thickness, which is burnable by the fire built by combustion of the first gas generating charge 19, for segregating the first and second gas generating charges 19 and 20 (or the upper compartment 15 and lower compartment 16). The inflator of Comparative example 1 is filled with 48 grams of only one gas generating charge which is equal to the first gas generating charge used in Example 1. The inflator of Comparative example 2 is filled with 48 grams of only one gas generating charge which is equal to the second gas generating charge used in Example 1. The inflator of Comparative example 3 is filled with only one gas generating charge comprised of the same guanidine composition as that of the first gas generating charge and formed generally into columns with 3.0 mm diameter, 6.5 mm length and about 1.64 mm$^2$/mm$^3$ sa/vol. This charge will be called the third gas generating charge herein below. That is, the inflators of Example 1 and Comparative examples 1 to 3 are filled with the same weight, i.e., 48 grams, of gas generating charges, respectively.

The graph of FIG. 2 shows curves of tank pressures of the inflators of Example 1 and Comparative examples 1 to 3 respectively secured in a stainless steel tank, having a 60 liter inner volume, as actuated. The point of peak tank pressure of each of the examples is indicated by "▼". The point of peak pressure indicates the time of completion of combustion of the gas generating charge(s). The graph shows that, out of the Comparative examples 1 to 3 each of which is filled with only one of the first, second and third gas generating charges, Comparative example 1 arrives at the peak pressure earliest, and Comparative example 3 arrives thereat latest. Thus it is presumed that the first gas generating charge is fastest in the speed of combustion and the third is slowest, with the second positioned in between.

Comparing the inflators of Example 1 and Comparative examples 1 and 2, the curve of Example 1 has a generally identical rise (inclination) in the initial phase of tank pressure to that of Comparative example 1, and has a smooth rising shape generally similar to that of Comparative example 2 after a predetermined time passed from actuation. Moreover, the point of peak pressure of Example 1 generally coincides with that of Comparative example 2. That is, when the ignition device is actuated in the inflator of Example 1, the combustion of the first gas generating charge firstly raises the tank pressure, and then the destruction of the partition wall allows the fire generated by combustion of the first charge to propagate to the second gas generating charge quickly over a wide area, thereby burning the second charge. The smooth rising curve of the inflator of Example 1 indicates that the partition wall burned down before the first gas generating charge completely burned out and the fire propagated to the second gas generating charge over a wide area and ignited a great deal of the second charge. The second gas generating charge, which is slow in combustion speed, sustainably burns after the completion of combustion of the first gas generating charge, such that the point of peak pressure generally coincides with the inflator of Comparative Example 2 filled with only a slow-combustion-speed gas generating charge and the discharge of inflation gas lasts for a long time.

As a consequence, with the inflator of Example 1, a sufficient amount of inflation gas is secured immediately after actuation and the duration of discharge of inflation gas is long.

The tank pressure curve of the inflator of Comparative example 2 seemingly indicates as if the inflator of Comparative example 2 raises the tank pressure more rapidly than that of Example 1 and keeps the tank pressure for an elongated time period, such that, when used in an airbag apparatus, it will enable the airbag to have a high inner pressure in the initial phase of inflation and keep the pressure even after completion of inflation, thereby being preferable for use in an airbag apparatus. Actually, however, the too rapid increase of the tank pressure of Comparative example 2 in the initial phase of actuation is likely to cause a breakage of an airbag at unfolding and inflation of the airbag. This is not preferable.

The rise of inner pressure curve (i.e., the discharge amount of inflation gas) in the initial phase of actuation of inflator and the time taken to reach the peak pressure can be adequately changed by appropriately selecting and combining the kind and contour (or surface-area-to-volume ratio) of the first and second gas generating charges. It is presumed that the inflator of Example 1 can keep a high inner pressure for an elongated time period by combustion of the second gas generating charge even after completion of combustion of the first gas generating charge because the inflator of Example 1 employs in combination the first gas generating charge which is fast in combustion speed (or completes combustion in a short time) and the second gas generating charge which requires a longer time to completion of combustion (i.e., which is slower in combustion speed) than the first charge and is capable of generating a greater amount of inflation gas per unit time than the first charge.

Figure 3:
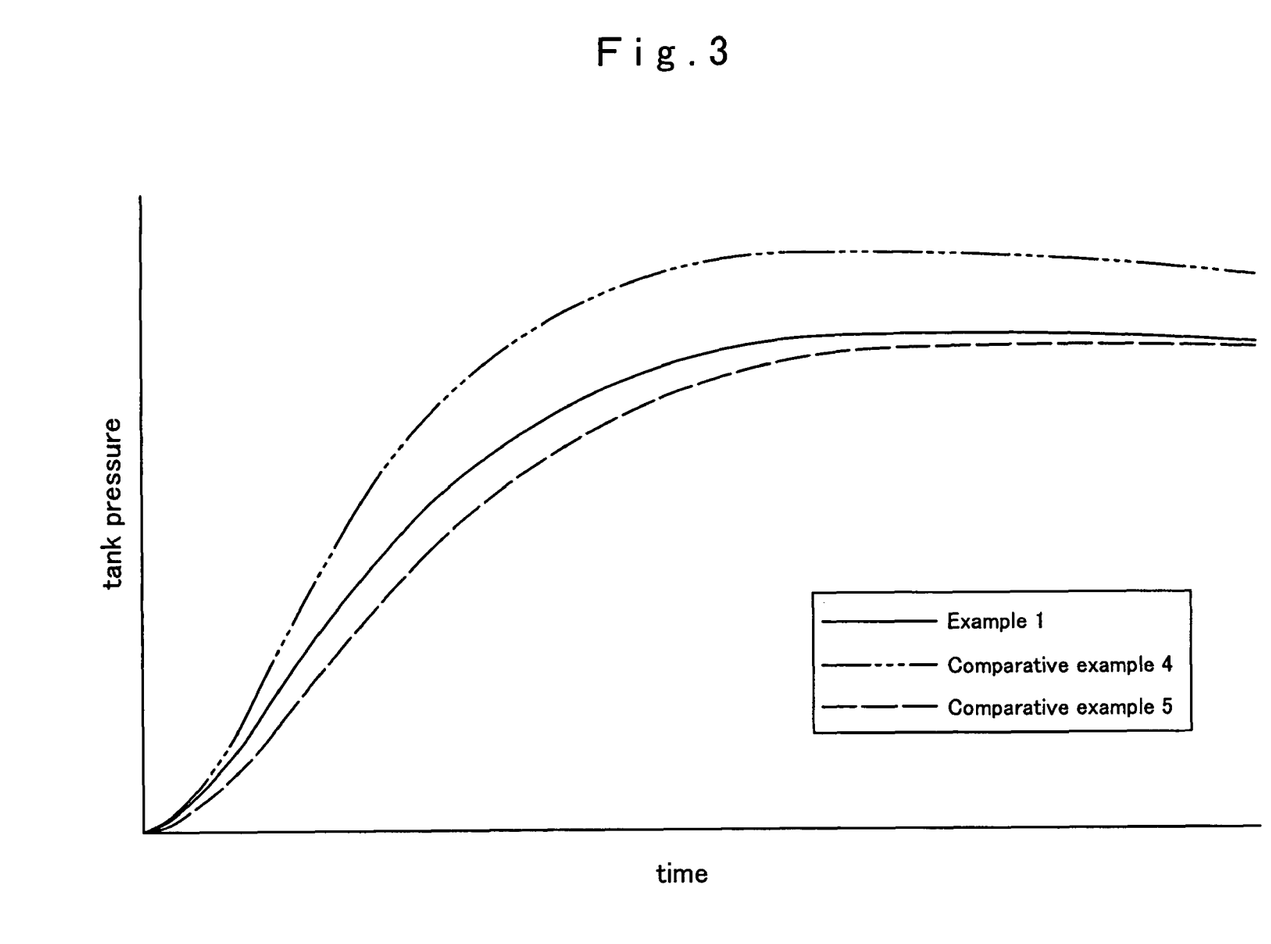
FIG. 3 is a graph showing the result of a tank pressure test of the inflator of FIG. 1 and those of other comparative examples.

The graph of FIG. 3 shows how inflator outputs differ depending on the way the first gas generating charge and second gas generating charge are filled in an inflator. The inflator 1 of Example 1 is the same as that described above, and Comparative Examples 4 and 5 differ from Example 1 only in the way of filling of the first and second gas generating charges. Specifically, Comparative example 4 does not include a partition wall and houses the first gas generating charge 19 and second gas generating charge 20 in the combustion chamber in a uniformly mixed fashion. Comparative example 5 does not include a partition wall either, but the first gas generating charge 19 are located above the second gas generating charge 20 put inside the combustion chamber in advance so as to prevent the two charges from mixing as much as possible. FIG. 3 shows curves of tank pressures of the inflators of Example 1 and Comparative examples 4 and 5 respectively secured in a stainless steel tank, having a 60 liter inner volume, as actuated.

It is understood from FIG. 3 that the inner pressure of the inflator of Comparative example 4 rapidly increases and then decreases, which means a possible breakage of an airbag. The inner pressure of Comparative example 5 is low in the initial phase of actuation, which means that the inflator of Comparative example 5 cannot enable an airbag to secure a sufficient inner pressure for arresting an out-of-position occupant. Comparative example 5 is approximate to Example 1 in that the first gas generating charge 19 and second gas generating charge 20 are so stored in the combustion chamber as not to mix with each other. However, the lack of the partition wall in Comparative example 5 will allow the first gas generating charge 19, which is smaller in size, to get into gaps between bigger tablets of the second gas generating charge 20 and get covered by the second gas generating charge 20. It is presumed that this reduced the amount of the first gas generating charge 19 ignitable initially and lowered the inner pressure in the initial phase of actuation, unlike in Example 1.

That is, FIG. 3 indicates that, in an inflator without a partition wall, the mixed condition of the first gas generating charge 19 and second gas generating charge 20 can vary depending on the posture at the mounting location on a vehicle, the inclination of the mounting location on the vehicle, and oscillation of the vehicle, and that such an inflator will exhibit varied output characteristics in a range between the curves of Comparative example 4 and Comparative example 5. In contrast, the curve of Example 1 indicates that the first and second gas generating charges 19 and 20 do not mix with each other until the partition wall 17 burns down, and once the partition wall 17 burns down due to combustion of the first gas generating charge 19, the second gas generating charge 20 ignites quickly, thereby exhibiting steady output characteristics.

Although the inflator of Example 1 is filled with two kinds of gas generating charges 19 and 20, it will also be appreciated to use three or more gas generating charges for filling compartments partitioned by a burnable partition wall(s). It is presumed that the point of peak pressure is further delayed by, for example, adding a third gas generating charge which is slower in combustion speed than the second respectively to the first and second gas generating charges and putting them in respective compartments partitioned by a partition wall.

What is claimed is:

1. An inflator comprising:
    a combustion chamber;
    an ignition device located inside the combustion chamber;
    a first gas generating charge filled in the combustion chamber for combustion, by ignition of the ignition device, to generate an inflation gas;
    a second gas generating charge filled in the combustion chamber at a location away from an ignition area of the ignition device, with the first gas generating charge interposed between itself and the ignition area, the second gas generating charge being slower in speed of combustion than the first gas generating charge and ignitable by a flame generated by combustion of the first gas generating charge; and
    a partition wall that segregates the first gas generating charge and second gas generating charge inside the combustion chamber so as to prevent the first and second charges from mixing, the partition wall being burnable to destruction by a fire built by combustion of the first gas generating charge so as to allow the fire to propagate to the second gas generating charge over a generally entire area that the partition wall bounds the first and second gas generating charges.

2. The inflator according to claim 1, wherein:
    at least one of the first gas generating charge and second gas generating charge is wrapped by a burnable covering material in the combustion chamber; and
    the partition wall is comprised of an area of the covering material that bounds the first gas generating charge and the second gas generating charge.

* * * * *